United States Patent [19]

Noy

[11] 4,359,739
[45] Nov. 16, 1982

[54] METHOD AND APPARATUS FOR NAVIGATION THROUGH PREDETERMINED LOITERING PATHS

[75] Inventor: Dan Noy, Ramat Hasharon, Israel

[73] Assignee: Israel Aircraft Industries, Ltd., Israel

[21] Appl. No.: 102,938

[22] Filed: Dec. 12, 1979

[30] Foreign Application Priority Data

Dec. 15, 1978 [IL] Israel ........................................ 56215

[51] Int. Cl.³ .............................................. G01S 3/02
[52] U.S. Cl. ........................... 343/112 D; 343/112 TC
[58] Field of Search .......... 343/112 C, 112D, 112 TC, 343/105 R, 105 H, 103; 318/581, 583; 364/433, 434, 441, 457, 451; 244/181, 183, 189, 190, 3.14

[56] References Cited

U.S. PATENT DOCUMENTS

| | | | |
|---|---|---|---|
| 2,787,428 | 4/1957 | Schuck | 343/108 R |
| 3,067,969 | 12/1962 | Goldberg et al. | 244/189 |
| 3,103,329 | 9/1963 | Unger et al. | 244/189 |
| 3,140,391 | 7/1964 | Daspit | 364/441 |
| 3,603,775 | 9/1971 | Galloway et al. | 364/457 |
| 3,863,256 | 1/1975 | Smith | 343/112 D |
| 3,988,734 | 10/1976 | Elwood | 343/112 D |
| 3,998,412 | 12/1976 | Baker et al. | 364/451 |

Primary Examiner—Theodore M. Blum
Attorney, Agent, or Firm—Benjamin J. Barish

[57] ABSTRACT

A method and apparatus are described for navigating an object, such as an aircraft, through a loitering path with respect to a central station, such as a ground station, which transmits timing signals for use in determining range therefrom. In the described method and apparatus, the object being navigated receives the timing signals and produces range signals indicating its range from the central station, inputs the range signals to a computer programmed to produce therefrom heading signals effective to navigate the object through a predetermined loitering path, and applies the heading signals to heading control means carried by the object to thereby navigate the object through the predetermined loitering path. The loitering path may be any continuous closed-loop curve spacially related to the central station, the preferred embodiment being a circular loitering path.

14 Claims, 2 Drawing Figures

METHOD AND APPARATUS FOR NAVIGATION THROUGH PREDETERMINED LOITERING PATHS

BACKGROUND OF THE INVENTION

The present invention relates to a method and to a system for navigating objects through predetermined loitering paths. The invention is particularly useful for navigating aircraft through predetermined loitering paths (e.g., a circular loitering path) with respect to a central or ground station, and is therefore described below in connection with this application, but it will be appreciated that the invention could advantageously be used to navigate other objects (e.g., ships), and through other loitering paths (e.g., elliptical).

Generally speaking, two types of navigating systems are presently in use. In one type of system the object being navigated continuously triangulates its own position between two differently-located transmitters. In the second type, the navigated object is continuously supplied with azmuth and range data identifying its position from a fixed ground station. These known systems are quite satisfactory in cases for navigating individual objects, e.g., aircraft, which maintain continuous contact with the ground stations in order to keep continuous track of their positions. However, when one or more aircraft are being navigated through a specific loitering path, the systems presently in use become very complicated and expensive, and require considerable expertise to operate.

BRIEF SUMMARY OF THE INVENTION

An object of the present invention is to provide a new method and system for navigating objects through predetermined loitering paths, which method and system have a number of advantages over the known systems as will be described more particularly below.

According to one broad aspect of the present invention, there is provided a method of navigating an object through a loitering path with respect to a central station, characterized in that the central station transmits omnidirectional timing signals for use in determining range therefrom; and in that the object being navigated receives said timing signals and produces range signals therefrom indicating its range from the central station, inputs said range signals to a computer programmed to produce therefrom heading signals effective to navigate the object through a predetermined loitering path defined by a continuous closed-loop curve spatially related to said central station, and applies said heading signals to heading control means carried by the object to thereby navigate the object through said predetermined loitering path.

In the preferred embodiment of the invention described below, the central station is a ground station, and the object being navigated is an aircraft. Preferably, the ground station transmits timing signals via an omnidirectional antenna which signals are received by a plurality of objects each having a computer programmed to produce therefrom heading signals effective to navigate the object through its respective predetermined loitering path.

A preferred embodiment is described below for purposes of example, in which the computer carried by the navigated object is programmed to output heading signals defining a circular loitering path. The description below shows how the computer may be programmed to produce the circular loitering path, but it will be appreciated that the invention could advantageously be used with respect to other loitering paths (e.g., illiptical or "Figure-8"), depending on how the computer is programmed.

According to another apsect of the invention, there is also provided a system for navigating an object through a loitering path, comprising; a central-station transmitter which transmits omnidirectional timing signals for use in determining range; a receiver carried by the navigated object for receiving said timing signals; range-determining means carried by the navigated object for producing range signals from said received central station timing signals; heading control means carried by the navigated object for controlling the heading thereof; a computer carried by the navigated object programmed to produce from said range signals heading signals effective to navigate the object through a predetermined closed-loop loitering path spatially related to said central station; means for continuously inputting the range signals produced by said range-determining means into said computer; and means for applying said heading signals from said computer to the heading control means to thereby navigate the object through said predetermined loitering path.

The invention provides a number of important advantages over the known systems for navigating objects through predetermined loitering paths. Thus, the system of the present invention requires only one fixed-station transmitter, as distinguished from the two transmitters required in the known triangulation method. Further, in the new system, the navigated object needs to receive only the timing signals transmitted from the single central-station transmitter; from these timing signals the navigated object itself continuously determines the required heading to navigate itself through the predetermined loitering path as programmed in its computer with initial constant parameters defining the specific loitering path and its spatial relationship to the central station. Such a system, therefore, is considerably simpler and less costly than either of the above-noted known navigation systems and requires considerably less expertise to operate.

Further, the novel system can easily serve a large number of navigated objects from a single central station, each object receiving the timing signals from the central station to determine its range therefrom, and making the necessary computations to navigate itself through its own loitering path as specified by the fixed constants stored in its computer. The novel system is also self-correcting, e.g. for wind drift in the case of aircraft, or ocean currents in the case of ships, since the system operates on ground coordinates. Still further, the navigated object finds its loitering area by a predictable path.

Further features and advantages of the invention will be apparent from the description below.

The method and system of the present invention are particularly useful for navigating aircraft through a predetermined loitering path with respect to a fixed station. There are many commercial applications for such a navigation system, for example, commercial aircraft "stacked" over a busy airport waiting for landing permission. Another possible application is navigating a plurality of small fishing vessals through predetermined loitering paths with respect to a mother ship.

Many other applications, both commercial and military, will be apparent.

BRIEF DESCRIPTION OF THE DRAWINGS

The invention is herein described, by way of example only, with reference to the accompanying drawings, wherein.

DESCRIPTION OF A PREFERRED EMBODIMENT

Before describing the navigating system illustrated in FIG. 2, the basic concepts of the present invention will first be described with reference to the diagram of FIG. 1.

Figure 1:
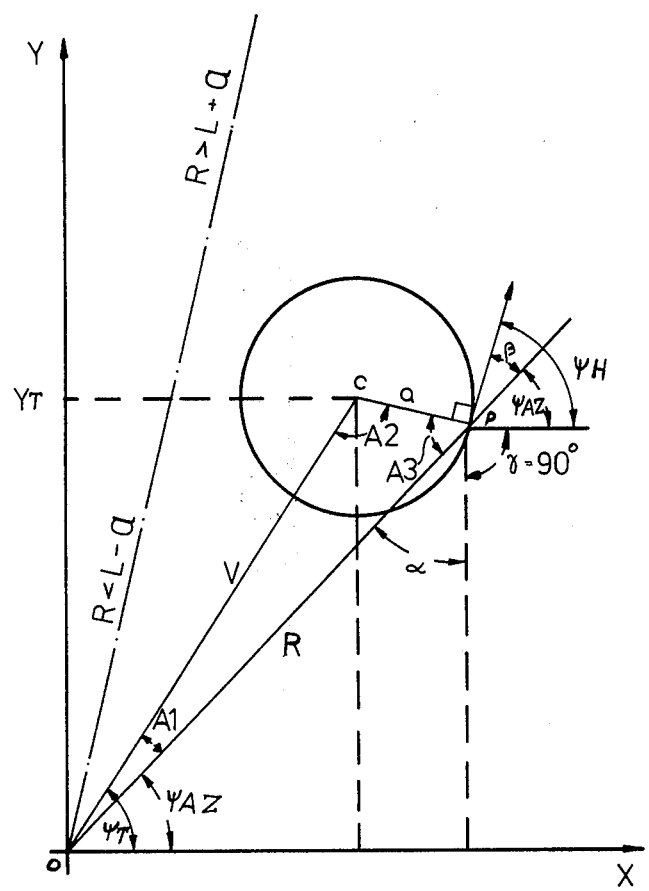
FIG. 1 is a diagram helpful in understanding the basic concepts involved in the method of navigation of the present invention.

In the diagram of FIG. 1, point "O" illustrates the location of a fixed ground station transmitting timing signals via an omnidirectional antenna so that the signals can be received by all aircraft in the area. Point "P" indicates the location of one such aircraft; its instantaneous range from the fixed-station transmitter is indicated by line "R". The aircraft "P" is to be navigated through a predetermined loitering path defined by a continuous closed-loop curve spatially related to the fixed-station "O". In the described example, this loitering path is a circular one having a radius "a", and a center "C" defined by the rectangular coordinates $X_c$, $Y_c$. The circle-center range from the fixed station transmitter "O" is indicated by line "1".

As will be shown below, the navigated object need receive only timing signals from one fixed-station transmitter, from which the object can compute its range "R" from the station, and from pre-programmed information, the heading ($\psi_H$) necessary to navigate itself through the predetermined loitering path.

The foregoing will be apparent from the following relationships illustrated in FIG. 1:

$\triangle OCP$: $\measuredangle A_1$, $\measuredangle A_2$, $\measuredangle A_3$.
$A_1 + A_2 + A_3 = 180°$ (Eq. 1)
$\therefore A_2 = 180 - (A_1 + A_3)$ (Eq. 2)
$\Sigma \measuredangle$ around point $P$: (start at $\gamma$):
$\gamma + \psi_h + 90° + A_3 + \alpha = 360° = 90° + \psi_h + 90° + A_3 + \alpha$
$\alpha = 90 - \psi_{AZ} = 90 - (\psi_c - A_1) = 90 - \psi_c + A_1$
$180 + \psi_h + A_3 + 90 - \psi_{AZ} = 360°$
$270 + \psi_h + A_3 + A_1 - \psi_c = 360$
$\therefore \psi_h + A_3 - A_1 - \psi_c = 90°$
$\psi_h + 180 - A_2 - \psi_c = 90°$
$\psi_h = A_2 + \psi_c - 90°$ by cosine LAW: $A_2 = \cos^{-1}\left[\dfrac{a^2 + 1^2 - R^2}{2a1}\right]$ (Eq. 3)

finally therefore:

$\psi_h = \cos^{-1}\left[\dfrac{a^2 + 1^2 - R^2}{2a1}\right] + tg^{-1}\dfrac{y_c}{x_c} - 90°$ (Eq. 4)

The foregoing proves the functional dependence of heading ($\psi_H$) on range (R) alone; i.e., $\psi_H = f(R)$. In this relationship:

$1 + a \geq R \geq 1 - a$

Accordingly, "1" must be greater than "a".

Figure 2:
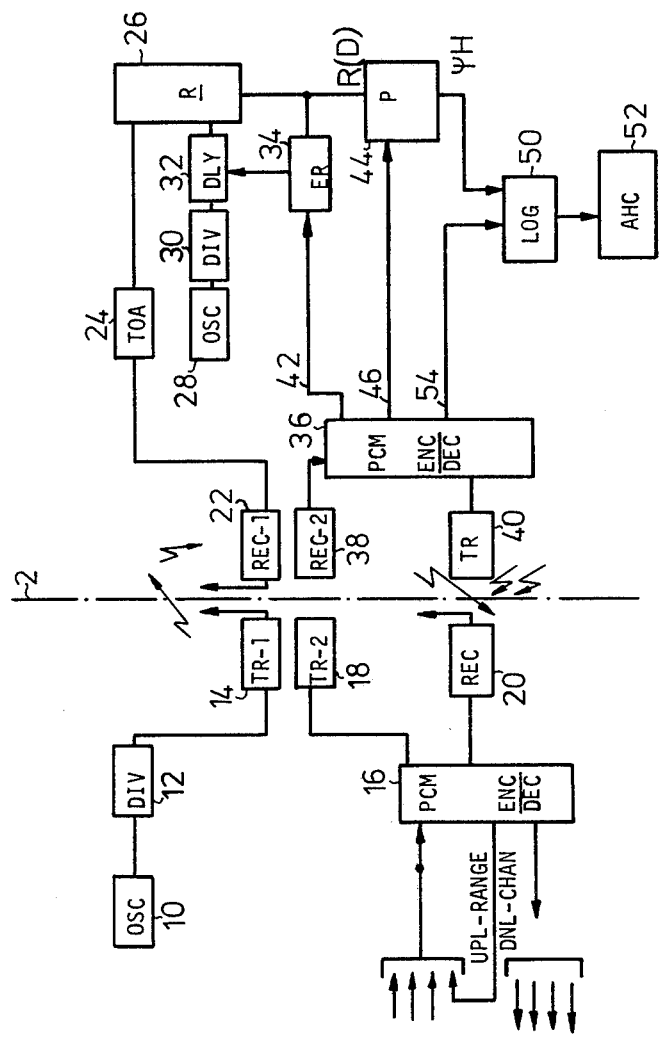
FIG. 2 is a block diagram illustrating one system for navigating an object, particularly an aircraft, through a predetermined (in this case, circular) loitering path in accordance with the present invention.

Reference is now made to the block diagram of FIG. 2 illustrating one form of navigation system constructed in accordance with the present invention. The system illustrated in FIG. 2 is divided into two sections: the equipment in the central ground station is shown to the left of the center broken-line 2, and the equipment carried by each of the aircraft to be navigated by the system is shown to the right of the broken-line 2.

Thus, the ground-station equipment includes a precision oscillator 10, e.g. of 10 MHz, whose output is fed to a divider 12 producing, e.g. 10 PPS (pulses per second), which are transmitted as timing signals by transmitter 14. These timing signals are received by the navigated aircraft and are used for determining the aircraft range from the ground station. This is the only equipment required by the ground station to permit the aircraft to navigate itself through the predetermined loitering path, the remaining equipment in the ground station illustrated in FIG. 1 being used for calibration purposes. Thus, the ground equipment includes a PCM (Pulse-Code-Modulation) Encoder-Decoder ranging unit 16 (of known design) whose output controls a second transmitter 18 for transmitting the synchronizing signals to the navigated aircraft. The ground equipment further includes a receiver 20 receiving signals from the navigated aircraft and feeding them to the ranging unit 16.

The equipment carried by the navigated aircraft includes a receiver 22 receiving the timing signals from the ground transmitter 14, and a TOA (Time of Arrival) unit 24 which measures the time of arrival of the received signals. The TOA unit 24 is of known construction and measures time of arrival from the mid-height point of the leading edge of the received timing pulse. This signal is fed into the input of a range-determining unit 26.

Range unit 26 is supplied with a second input derived from a precision oscillator 28 and a divider 30 producing exactly the same timing pulses, e.g. 10 PPS, as the ground oscillator 10 and divider 12. The aircraft further includes a delay circuit 32, which delay is variable by an error circuit 34.

The signals generated by the local oscillator 28 and divider 30 are used as reference timing signals whose phase is compared in range unit 26 with the ground timing signals transmitted by ground transmitter 14, and received by the aircraft receiver 22, to determine the range of the aircraft from the ground station. Thus, the range (R) is equal to the time lag ($\tau$) between the transmitted and received signals, multiplied by the speed of light ($V_L$); i.e., $R = \tau \cdot V_L$.

The delay circuit 32, controlled by the error circuit 34, is used for in-flight synchronization of the phase of the locally-generated reference timing signals with respect to the ground timing signals. This synchronization is effected by conventional ranging equipment, including a PCM encoder-decoder 36 carried by the aircraft which receives, via receiver 38, the ground-transmitted signals from the ranging unit 16 and transmits, via transmitter 40, the range signals received by the ground receiver 20. When making an in-flight calibration of the aircraft navigation equipment, the two ranging units 16 and 36 are used in the usual manner for measuring actual range of the aircraft from the ground station, the error being outputted via line 42 to the error unit 34. The latter unit controls the delay circuit 32 which shifts the phase of the locally-generated reference signals (from oscillator 28) until the error is reduced to zero. When this calibration is completed, the timing signals outputted by the local oscillator 28, via the delay circuit 32 into the range unit 26, are exactly in phase with the ground timing signals from transmitter 14.

Once the aircraft-carried navigation equipment is thus synchronized, it will be seen from the above-discussed relationship $R = \tau \cdot V_L$ that the output signals from the range unit 26, which measures the difference in phase ($\tau$) between the locally generated timing signals (oscillator 28) and the received ground-transmitted timing signals (receiver 22, TOA unit 24), will be a measurement of the range of the aircraft from the ground station.

The range signals are continuously fed to a computer 44 which has been programmed to produce heading signals from the range signals, according to the relationship defining the continuous closed-loop loitering path through which the aircraft is to be navigated. If the loitering path is to be a circular one, then the computer would make the computation described above for a circular loitering path, in which case it would be pre-programmed with the initial values "a", "$X_c$", "$Y_c$" and "1", defining the fixed parameters of the continuous closed loop loitering path and its spatial relationship to the fixed-ground station. Thus, the only variable parameter that the computer 44 requires is the range (R), which is continuously inputted from the range unit 26. The computer thus produces output signals ($\psi_H$) corresponding to the heading necessary to navigate the object through the specified circular loitering path with respect to the central ground station.

The heading signals ($\psi_H$) are fed via a logic unit 50 to the heading control 52 of the aircraft autopilot. The logic unit 50 is also supplied with the normal heading signals from the PCM encoder-decoder 36 via line 54, and selectively feeds either the latter signals, or the signals from the computer 44, to the heading control unit of the autopilot, thereby enabling the aircraft to be navigated in the conventional manner by the heading signals from the aircraft PCM encoder-decoder 36, or to be locked into the predetermined loitering path by the heading signals outputted from the computer 44.

It will thus be seen that the invention provides an extremely simple method and apparatus for navigating aircraft or other objects through a predetermined loitering path, which system requires the navigated object to receive only timing signals from one ground-station transmitter to enable it to determine its range therefrom. While a circular loitering path has been described above, it will be appreciated that the loitering path could be another form of closed-loop curve, such as an elliptical curve or a Figure-8 curve, it only being necessary to program the aircraft computer 44 according to the specific loitering path desired. Preferably, the equipment of the navigated aircraft is calibrated in-flight as described above, but it will be appreciated that a pre-flight or other calibration procedure may be used. Further, it would normally be preferable for the central ground station to transmit the timing signals via an omnidirectional antenna so that one station can serve many aircraft in the same area, each navigating itself according to its own specified loitering path. It will be appreciated, however, that directional antennas may be also used if it is necessary or desirable to lower the transmitter power requirements, but in such case a smaller sector area, and therefore fewer aircraft, would be served by the ground station.

Many other variations, modifications and applications of the invention will be apparent.

What is claimed is:

1. A method of navigating an object through a loitering path with respect to a central station, characterized in that said central station transmits omnidirectional timing signals for use in determining range therefrom; and in that the object being navigated receives said timing signals and produces range signals therefrom indicating its range from the central station, inputs said range signals to a computer programmed to produce therefrom heading signals effective to navigate the object through a predetermined loitering path defined by a continuous closed-loop curve spatially related to said central station, and applies said heading signals to heading control means carried by the object to thereby navigate the object through said predetermined loitering path.

2. The method according to claim 1, wherein the fixed station is a ground station, and the object being navigated is an aircraft.

3. The method according to claim 2, wherein the aircraft being navigated produces range signals by measuring the difference in phase between the received central-station timing signals and locally-generated timing signals having a phase identical to the timing signals transmitted by the central station.

4. The method according to claim 3, wherein the phase of the locally-generated timing signals is precalibrated in flight by signals received from a transmitter at said central station.

5. The method according to claim 1, wherein the central station transmits timing signals via an omnidirectional antenna which signals are received by a plurality of objects each having a computer programmed to produce therefrom heading signals effective to navigate the object through its respective predetermined loitering path.

6. The method according to claim 1, wherein the computer carried by the navigated object is programmed to output heading signals defining a circular loitering path.

7. The method according to claim 6, wherein the computer carried by the navigated object continuously computes the heading signals ($\psi_H$) according to the following relationship:

$$\psi_H = \cos^{-1}\left[\frac{a^2 + 1^2 - R^2}{2a1}\right] + tg^{-1}\left[\frac{Y_c}{X_c}\right] - 90°$$

wherein:
"R" is the computer-inputted value corresponding to the range signals;
"a" is the computer-inputted radius of the circular loitering path;
"Xc" and "Yc" are the computer-inputted coordinates of the center of the circular loitering path from the central station; and
"1" is the computer-calculated distance of the center of the circular loitering path from the central station.

8. A system for navigating an object through a loitering path, comprising; a central-station transmitter which transmits omnidirectional timing signals for use in determining range; a receiver carried by the navigated object for receiving said timing signals; range-determining means carried by the navigated object for producing range signals from said received central-station timing signals; heading control means carried by the navigaged object for controlling the heading thereof; a computer carried by the navigated object programmed to produce from said range signals heading signals effective to navigate the object through a predetermined closed-loop loitering path spatially related to said central-station; means for continuously inputting the range signals produced by said range-determining means into said computer; and means for applying said heading signals from said computer to the heading control means to thereby navigated the object through said predetermined closed-loop loitering path.

9. A system according to claim 8, wherein the central-station is a ground station, and the object being navigated is an aircraft.

10. A system according to claim 8, wherein said range determining means carried by the navigated object includes means for locally-generating a reference timing signal, means for synchronizing the phase of the locally-generated reference timing signal with the received central-station timing signal, and means for measuring the difference in phase between the locally-generated reference timing signal and the received central-station timing signal to produce said range signals.

11. A system according to claim 10, wherein said synchronizing means is carried by the navigated object for effecting in-flight synchronization of the phase of the locally-generated timing signals with the received central-station timing signals.

12. Apparatus according to claim 11, wherein said synchronizing means comprises means for measuring actual range from the central-station transmitter to the navigated object while the object is in-flight, means for measuring the actual range therefrom, an error circuit for determining any error between the two measurements, and a delay circuit controlled by the error circuit for shifting the phase of the locally-generated timing signals until the error is reduced to zero.

13. The system according to claim 8, wherein said computer carried by the navigated object is programmed to compute, from the range signals, heading signals ($\psi_H$) defining a circular loitering path for the navigated object according to the following relationship:

$$\psi_H = \cos^{-1}\left[\frac{a^2 + 1^2 - R^2}{2a1}\right] + tg^{-1}\left[\frac{Y_c}{X_c}\right] - 90°$$

wherein:
"R" is the computer-inputted value corresponding to the range signals;
"a" is the computer-inputted radius of the circular loitering path;
"Xc" and "Yc" are the computer-inputted coordinates of the center of the circular loitering path from the central station; and
"1" is the computer-calculated distance of the center of the circular loitering path from the central station.

14. A system according to claim 8, wherein the central-station transmitter includes an omnidirectional antenna transmitting timing signals in all directions, there being a plurality of navigated objects each carrying its own receiver, range-determining means, heading control means, and computer programmed to navigate the object through its respective predetermined loitering path.

* * * * *